3,600,354
PIGMENT/POLYMER CONCENTRATE AND
METHOD FOR ITS PREPARATION AND USE
Ernst-Guenter Kunze, Frankfurt am Main, Rudi Groepler, Schoneberg, Taunus, Robert Lauerbach-Lehmeier, Frankfurt am Main, and Herbert Toepper, Obertshausen, Germany, assignors to Vickers-Zimmer Aktiengesellschaft Planung und Bau von Industrieanlagen
No Drawing. Filed Aug. 23, 1968, Ser. No. 754,974
Claims priority, application Germany, Sept. 7, 1967, V 34,399
Int. Cl. C08b 27/02; C08f 45/02; C08g 51/02
U.S. Cl. 260—40
12 Claims

ABSTRACT OF THE DISCLOSURE

A pigment/polymer concentrate and method for its preparation comprising treating solid polymer particles to roughen the surfaces thereof, incorporating pigment into said roughened surfaces at a temperature below the softening temperature of said polymer, forming larger concentrate granules by heating and agitating the treated polymer particles at a temperature between the softening temperature and the melting temperature of said polymer to sinter the treated polymer particles together at their contact surfaces with inclusion of further pigment particles therebetween. The term "pigment" includes other particulate conventional additives.

BACKGROUND OF THE INVENTION

The invention relates to a method of producing pigmented polymeric material.

A basic requirement of pigmented high polymers is that the pigment be present in a satisfactory, uniform and fine distribution and in the desired concentration. The pigment particles must be prevented at all costs from forming agglomerates, particularly when the pigmented polymer is to be spun into filaments since the presence of pigment agglomerates greatly impairs the textile properties of the filaments, especially small diameter filaments. Also, when the pigment is a dye, its non-uniform distribution in the polymer causes an undesirable non-uniform and mottled appearance.

However, it is difficult to mix pigments with polymers thoroughly because the polymers are usually viscous. attempts have been made to add the pigments to the more readily miscible and stirrable starting materials or monomers from which the polymer is formed. This has the disadvantages, however, that undesirable side reactions may occur, even when catalysts are used, and that the entire installation is contaminated with the pigment, resulting in the necessity for long cleaning intervals and considerable waste of material when different pigments, particularly in the case of dyes, are to be used successively.

On the other hand, it has been proposed to mix the pigment with the polymer immediately prior to processing (e.g. spinning or extruding) the polymer. This procedure is essential with pigments that have a low permanent heat resistance so that they can be exposed to heat only for a very short period.

Many other processes have been proposed for incorporating pigments in polymers. For example, it has been suggested that the pigment be suspended in a carrier liquid and the suspension mixed with the polymer. Suitable carrier liquids include molten materials that are solids at room temperature, water, alcohols and plasticisers. However, the use of such suspensions has the disadvantage that the properties of the polymer are often unfavorably affected when the liquid carrier remains in the polymer or the carrier liquid has to be removed from the polymer, for example by evaporation.

It has been proposed to mix polyester chips in the dry state with highly dispersed pigment powder and then temper in vacuo the polymer particles with pigment adhering to their surfaces. Owing to the small surface area of the chips, however, only restricted amounts of dye can be absorbed, since only a small amount of dye will adhere to the smooth chip surfaces, and little dye is absorbed in the process and thus only a light coloration can be produced.

Mixing or kneading pasty or dissolved polymer intimately with the dye has been tried but this necessitates a subsequent drying step.

It has been suggested that the amount of pigment which may be applied to the surface of polymer chips is increased by mixing the pigments with solvents and/or binders (e.g. consist of polymers dissolved in solvents) and applying them to the polymer granulates in the form of a film or lacquer. However, this also necessitates a subsequent drying step.

In all of these prior art processes, the attempt is made to permeate the entire polymer mass with pigment partices in one step. However, pigmentation of the entire polymer mass in one step has the important disadvantage that the self-cleaning action of the polymerization, melting and spinning equipment when changing to another pigment, particularly another dye, is very slow and involves considerable waste of material. This disadvantage can only be obviated by using concentrates consisting of pigment dispersed in polymer. These concentrates are added in the form of a fused mass to the pigment-free polymer only immediately before spinning.

The advantage of using concentrate chips and mixing them with a pigment-free polymer is the fast and almost transition-less self-cleaning of the melting and spinning equipment.

It has been proposed to mix the pigment with a small amount of the appropriate monomer and then polymerize the monomer by heating. The resulting homogeneous pigment/polymer dispersion, which may contain 50% or more pigment, is then distributed in the fused mass of high polymer to be pigmented and subsequently spun. The concentrate of polymer and pigment prepared in this way preferably has a lower degree of polymerization than the high polymer to be pigmented. However, this process has the disadvantage that either an additional polymerization step must be included for the concentrate manufacture, or the monomeric pigment concentrate must be fed into the monomers being polymerized to form the high polymer in which case the entire reactor becomes contaminated with pigment.

It has also been proposed to enrich dissimilar and similar high polymer with 50 to 60% of dye and then add these homogeneous concentrates to the fused mass of polymer. The concentrates are prepared by coloring a solution of the polymer in a solvent with a small amount of dye and precipitating the dye and the polymer together by the addition of a substance that does not act as a solvent for either of these two substances. This process is also very unsatisfactory, since it necessitates several operational steps including dissolving, coloring and precipitating.

It has also been suggested to mix solvents, polyesters and pigment and then evaporate the solvent. After drying, a solid pigment concentrate remains and this is ground into coarse particles (a few millimeters in size). However, this process is extremely cumbersome.

It is, accordingly, an object of the present invention to provide a novel method for preparing pigmented polymers.

It is another object of the invention to provide a novel pigment/polymer concentrate for use in making pigmented polymers.

It is a further object of the invention to provide novel pigmented polymers.

These and other objects can be gathered from a reading of the disclosure herein.

SUMMARY OF THE INVENTION

We have now discovered that very satisfactory pigmented polymers can be prepared by mixing polymer with a pigment/polymer concentrate which has been prepared in a particular way.

According to the invention, we provide a method of preparing a pigmented polymer which comprises (1) preparing a pigment/polymer concentrate by thoroughly mixing the pigment with finely divided mechanically comminuted solid polymer at a temperature below the softening temperature of the polymer and heating the mixture with agitation to a temperature above the softening temperature of the polymer, and (2) thoroughly mixing the concentrate with polymer to form pigmented polymer.

The invention also provides a pigment/polymer concentrate for use in the production of pigmented polymers which has been prepared by thoroughly mixing pigment with finely divided mechanically comminuted solid polymer at a temperature below the softening temperature of the polymer and heating the mixture with agitation to a temperature above the softening temperature of the polymer.

DESCRIPTION OF THE PREFERRED EMBODIMENTS

The finely comminuted polymer is prepared by mechanical comminution. It is not generally sufficient simply to use small chips since these will have smooth surfaces to which, as already stated, the pigment will not adhere sufficiently. Concentrates prepared using small chips are also unsatisfactory in that separation takes place during transport or conveyance.

The mechanical comminution of the polymer to a very small particle size increases the surface area of the polymer and also causes the particle surface to be roughened and fissured. This enables a relatively large quantity of pigment to be incorporated without heating. Waste materials from the processing of the polymer, for example spinning-waste discs and cakes, are very suitable for the manufacture of pigment concentrates. Pigment-agglomerate formation does not occur.

Although the size of the polymer particles used in the first stage of the process is not critical, best results have been obtained with sizes in the range of $10^{-5}$ to $7 \times 10^{-1}$ mm.$^3$, preferably of $10^{-4}$ to $10^{-1}$ mm.$^3$.

The heat treatment in step (1) is advantageously carried out above the softening temperature but below the melting temperature of the high polymer in a mixer under a vacuum or an inert-gas atmosphere and the granules of concentrate formed by the sintering effect is advantageously cooled to a temperature below the softening point of the high polymer with constant stirring or circulation before being brought out into the atmosphere. The brief heating above the softening point of the polymers causes the pigment particles to be sintered to the polymer. Individual polymer particles also sinter together at their contact surfaces and thus enclose further pigment particles. The pigment particles do not sinter together with each other under the conditions of the present process, which is particularly important. Separation of pigment and polymers does not take place readily. The cooling with constant stirring under vacuum or inert gas atmosphere prevents the mass of granules of concentrate from being baked and damaged by atmospheric oxygen.

The concentrate obtained may be used in two ways. Firstly, the granules of concentrate may be stored in the case of batch operation, or secondly, it may be fed immediately to a melt extruder, which carries out the mixing of the concentrate with non-pigmented, molten polymer.

If, however, it is desired to process the concentrate immediately, i.e. to mix it immediately with the pigment-free polymer, it is particularly advantageous to carry out the heat treatment in step (1) above the melting temperature of the high polymer in a melt extruder and then mix the resulting concentrate-fused mass immediately with the fused mass of non-pigmented high polymer.

Pigments which can be incorporated in polymers by the method of this invention include, for example, dyes, fillers, dulling agents, optical brighteners and stabilizers.

The invention is further described and illustrated by the following examples.

Example 1

200 kg. of polyester chips in the form of cylindrical sections having a diameter of 2 mm. and a length of 3 mm. were ground up in a baffle-plate impact mill (type PP6, made by Pallmann). Sieve analysis showed the following particle-size distribution:

| Mm.: | Percent |
|---|---|
| >0.5 | 0 |
| 0.4–0.5 | 37 |
| 0.3–0.4 | 32 |
| 0.2–0.3 | 18.5 |
| <0.2 | 12.5 |

Microscopic examination showed that the surfaces of the particles were very fissured and the particles were in the form of splinters. The temperature did not exceed 43° C. during the grinding process in the mill.

40 kg. of the polyester powder thus prepared were placed in a dry mixer of a drying-cooling mixer combination (type TSE H 150–KMSO 200 made by Papenmeier). The powder was stirred for about 7 minutes under a vacuum while the polyester powder was heated to 180° C. The vacuum was then removed and an atmosphere of nitrogen was introduced. 10 kg. of the pigment "Heliogenblau" (made by BASF), a dye of the phthalocyanine group, with a particle size of less than $5\mu$, was then added, whereupon the temperature was gradually increased to 225° C. (measured on a deflecting device in the product or mixer) with constant stirring. The polyester particles sintered together with the inclusion of the dye particles. The product was then immediately discharged into the series-connected cooling mixer of the combination having a water-cooled jacket in order substantially to prevent the decomposition of the polyester that would take place with slow cooling. The granules of concentrate had an average particle size of 2–3 mm. diameter. On further processing, the concentrate, containing 20% dye, was melted in a melt extruder and mixed with 20 times the amount of dye-free polyester fused mass (temperature 280° C.) in a mixer immediately prior to spinning. Filaments with a 1% dye content that were deep blue in color and with good textile properties, were produced.

Example 2

40 kg. of the polyester powder prepared as in Example 1 were mixed cold with 10 kg. of "Heliogenblau," maximum particle size $5\mu$, for 10 minutes in a V-mixer. The V-mixer consisted of a V-shaped tube with closed ends, which rotated about an axis passing through both legs, the material to be mixed moving to and fro between the leg ends and the apex of the "V." The powder mixture was then fed to a melt extruder and melted at 270° C. The fused mass of concentrate was mixed as in Example 1 by means of a metering pump with 20 times the amount of dye-free polyester fused mass (temperature 280° C.). Blue pigmented polyester was thus produced.

Example 3

40 kg. of the polyester powder prepared as in Example 1 were sintered together as in Example 1 with 20 kg. of titanium dioxide as dulling agent, until a concentrate of a particle size of 2–3 mm. diameter was produced. The concentrate containing 33⅓% of dulling agent was melted on further processing in a melt extruder and mixed with 110 times the amount of non-dulled polyester fused mass (temperature 280° C.) in a mixer immediately prior to spinning. Filaments containing 0.3% of well distributed dulling agent and having good textile properties were produced.

Example 4

36 kg. of the polyester powder prepared as in Example 1 were mixed cold in a V-mixer for 10 minutes with 4 kg. of an alkylphosphonic acid ester as a heat stabilizer for the polyester. The mixture was then melted at 270° C. in a melt extruder. The fused mass of concentrate was added to 20 times the amount of non-stabilized polyester fused mass, resulting in a stabilizer concentration of 0.5%. The degradation of the polyester fused mass from the feed-in point of the stabilizer to the spun-out filaments was insignificant.

Example 5

38 kg. of the polyester powder prepared as in Example 1 were processed as in Example 4 with 2 kg. of "Tinopal" (made by Geigy) as an optical brightener, and then added to 100 times the amount of pure polyester fused mass, resulting in a brightener concentration of 0.05% with an extremely uniform distribution in the resulting polymer.

Example 6

200 kg. of washed and dried polyester waste, in the form of cakes, "castings," and fibers (stretched and unstretched), were cut (on an "ultra-granulator PS 4–5/A5" type cutter made by Pallmann). The cutter had a sieve therein with a mesh size of 6 x 6 mm. The average length of the cut fibers was 3 to 4 mm., and the diameter 0.02–0.04 mm. The processes in Examples 1 to 5 were repeated using this polymer to form the concentrates, with substantially the same results.

Example 7

50 kg. of washed nylon 6 waste material, in the form of wool, with a residual water content of about 20% were cut (on an "ultra-granulator PS 4–5/A5" type cutter made by Pallmann). The cutter had a sieve therein having a mesh size of 6 x 6 mm. The average length of the cut fibers was 3–4 mm., and the diameter was 0.02–0.04 mm.

The fibers were fed into the drying mixer stage of a drying cooling mixer combination (type TSEH 150-KMSO 200 made by Papenmeier). The temperature was raised to 130° C. in 4 minutes for the purpose of drying and a vacuum was applied at the same time. After the completion of drying, the vacuum was interrupted with nitrogen and 10 kg. of titanium dioxide with a particle size of less than 1$\mu$ were added as a dulling agent to the dry nylon 6 waste which now weighed 40 kg. The temperature was then gradually raised to 180° C. (measured on a deflecting device in the product or in the mixer) with constant stirring. The product was then discharged immediately into the series-connected cooling mixer, in order substantially to prevent the decomposition of the polyamide that would take place with slow cooling.

The granules of concentrate had an average particle size of 1 mm. On further processing, the concentrate containing 20% of dulling agent was melted in a melt extruder and mixed with 70 times the amount of non-dulled nylon 6 fused mass in a mixer immediately prior to spinning. Filaments containing 0.3% of dulling agent, which had good textile properties, were obtained.

The invention has been described in detail with reference to particular and preferred embodiments thereof, but it will be understood that variations and modifications can be made within the spirit and scope of the invention as described hereinabove and as defined in the appended claims.

What is claimed is:

1. A method for preparing a pigment/polymer concentrate for use in the production of pigmented polymers which comprises the steps of:

treating solid polymer particles to roughen and fissure the surfaces of said polymer particles and reduce them to finely divided form, thoroughly mixing a pigment with said treated solid polymer particles at a temperature below the softening temperature of said particles thereby to form a pigment/polymer mixture with pigment incorporated in said roughened and fissured surfaces, heating and agitating said mixture at a temperature above the softening temperature of said polymer and below the melting point of said polymer, and maintaining said heating and agitation for a time sufficient to sinter a plurality of said mixture particles together at their contact surfaces with inclusion of further pigment particles therebetween, and to form pigment/polymer concentrate granules thereof, said concentrate granules having an average size larger than said treated solid particles and having pigment incorporated both in said surfaces of said mixture particles and in said concentrate granules without pigment agglomeration.

2. A method of preparing a pigmented polymer which comprises:
   (1) preparing a pigment/polymer concentrate by the method of claim 1, and (2) thoroughly mixing said concentrate with polymer to form pigmented polymer.

3. A method according to claim 1 wherein said particles of solid polymer are treated by mechanical comminution, and said comminuted particles have a size in the range of about $10^{-5}$ to $10^{-1}$ mm.$^3$.

4. A method according to claim 1 wherein the heating and agitating of said pigment/polymer mixture at a temperature above the softening temperature of said polymer and below the melting point of said polymer occurs under vacuum or in an inert gas atmosphere.

5. A method according to claim 1 which includes the added step of cooling the concentrate to below the softening temperature of the polymer.

6. A method according to claim 5 wherein the concentrate is cooled under vacuum or in an inert gas atmosphere before being exposed to air.

7. A method as in claim 3 wherein said solid polymer particles being treated are waste materials.

8. A method as in claim 3 wherein said solid polymer particles treated to roughen and fissure the surfaces thereof are polymer chips having a size on the order of about 2 mm. in diameter.

9. A method as in claim 1 wherein the temperature of mixing pigment with said treated solid particles to form a pigment/polymer mixture with pigment incorporated in said roughened and fissured surfaces is below about 180° C., and the temperature of heating and agitating said pigment/polymer mixture for a time sufficient to sinter a plurality of said mixture particles to form concentrate granules is below about 225° C.

10. A method as in claim 1 wherein said concentrate granules produced have an average particle size in the range of from about 1 to 3 mm. in diameter.

11. A method as in claim 4 wherein the mixing of a pigment with said treated solid particles to form a pigment/polymer mixture with pigment incorporated in said roughened and fissured surfaces occurs under vacuum or in an inert gas atmosphere.

12. A pigment/polymer concentrate consisting essentially of finely divided polymer particles, the surfaces of which are roughened and fissured, said surfaces containing pigment sintered therein forming pigment/polymer particles, a plurality of said polymer particles are sintered together at their contact surfaces to form granules larger than said polymer particles, and which granules enclose additional pigment therebetween.

References Cited

UNITED STATES PATENTS

| | | | |
|---|---|---|---|
| 2,837,437 | 6/1958 | Finlayson et al. | 106—198 |
| 2,540,146 | 2/1951 | Stober | 260—41 |
| 3,496,133 | 2/1970 | Hoffman | 260—40P |

FOREIGN PATENTS

| | | | |
|---|---|---|---|
| 655,810 | 1/1963 | Canada | 260—41 |

OTHER REFERENCES

Renfrew et al. (Editors), "Polythene," Interscience Publishers Inc., New York, pp. 410–412, 414 and 421–423, 1957.

ALLAN LIEBERMAN, Primary Examiner

U.S. Cl. X.R.

106—198, 241; 260—37, 41, 96